US008855295B1

(12) United States Patent
Chhetri et al.

(10) Patent No.: US 8,855,295 B1
(45) Date of Patent: Oct. 7, 2014

(54) ACOUSTIC ECHO CANCELLATION USING BLIND SOURCE SEPARATION

(75) Inventors: Amit S. Chhetri, Sunnyvale, CA (US); Kavitha Velusamy, San Jose, CA (US); Wai C. Chu, San Jose, CA (US); Ramya Gopalan, Cupertino, CA (US)

(73) Assignee: Rawles LLC, Wilmington, DE (US)

( * ) Notice: Subject to any disclaimer, the term of this patent is extended or adjusted under 35 U.S.C. 154(b) by 88 days.

(21) Appl. No.: 13/532,617

(22) Filed: Jun. 25, 2012

(51) Int. Cl.
*H04M 9/08* (2006.01)
*G10K 11/00* (2006.01)

(52) U.S. Cl.
CPC .................................. *G10K 11/002* (2013.01)
USPC ..................................................... 379/406.03

(58) Field of Classification Search
USPC .................................................... 379/406.03
See application file for complete search history.

(56) References Cited

U.S. PATENT DOCUMENTS

| 2002/0126834 | A1* | 9/2002 | Seibert ..................... 379/406.01 |
| 2009/0022336 | A1* | 1/2009 | Visser et al. ................. 381/94.7 |
| 2010/0020980 | A1* | 1/2010 | Kim ............................. 381/71.1 |
| 2011/0014981 | A1* | 1/2011 | Mao et al. ....................... 463/36 |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

\* cited by examiner

*Primary Examiner* — Alexander Jamal
(74) *Attorney, Agent, or Firm* — Lee & Hayes, PLLC

(57) ABSTRACT

Techniques for utilizing blind source separation as a front-end to an acoustic echo canceller are described herein. The techniques include removing a first portion of an acoustic echo from an audio signal using blind source separation and a reference signal. The techniques then further remove a second portion of the acoustic echo using an acoustic echo canceller and the reference signal. Further, output of the blind source separation may be used to improve double-talk detection.

24 Claims, 4 Drawing Sheets

ACOUSTIC ECHO CANCELLATION USING BLIND SOURCE SEPARATION

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

Many of these electronic devices enable voice communication. These devices often face practical problems such as double talk, noisy environments, and so forth. In the case of double talk, a communication device receives a far end signal from a far end talker typically over a network. The far end signal may be played via a loudspeaker of the communication device while a near end talker is speaking into microphones of the communication device. The near end talker may be relatively far away from the microphones as compared to a distance of the loudspeaker from the microphones. Accordingly, sound played out of the loudspeaker corresponding to the far end signal may echo and reach the microphones at roughly the same time as sound from the near end talker. This situation is referred to as "double talk".

Acoustic performance of the communication device is degraded when double talk is present as the near-to-far ratio is often decreased. Additionally, the presence of reverb and/or background noise from sources such as other talkers in the room, or other devices in the room (e.g., TV, radio, etc.) may further deteriorate the speech recognition performance. It is therefore desired to improve the acoustic performance by minimizing the effects of double talk, reverb, and background noise.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
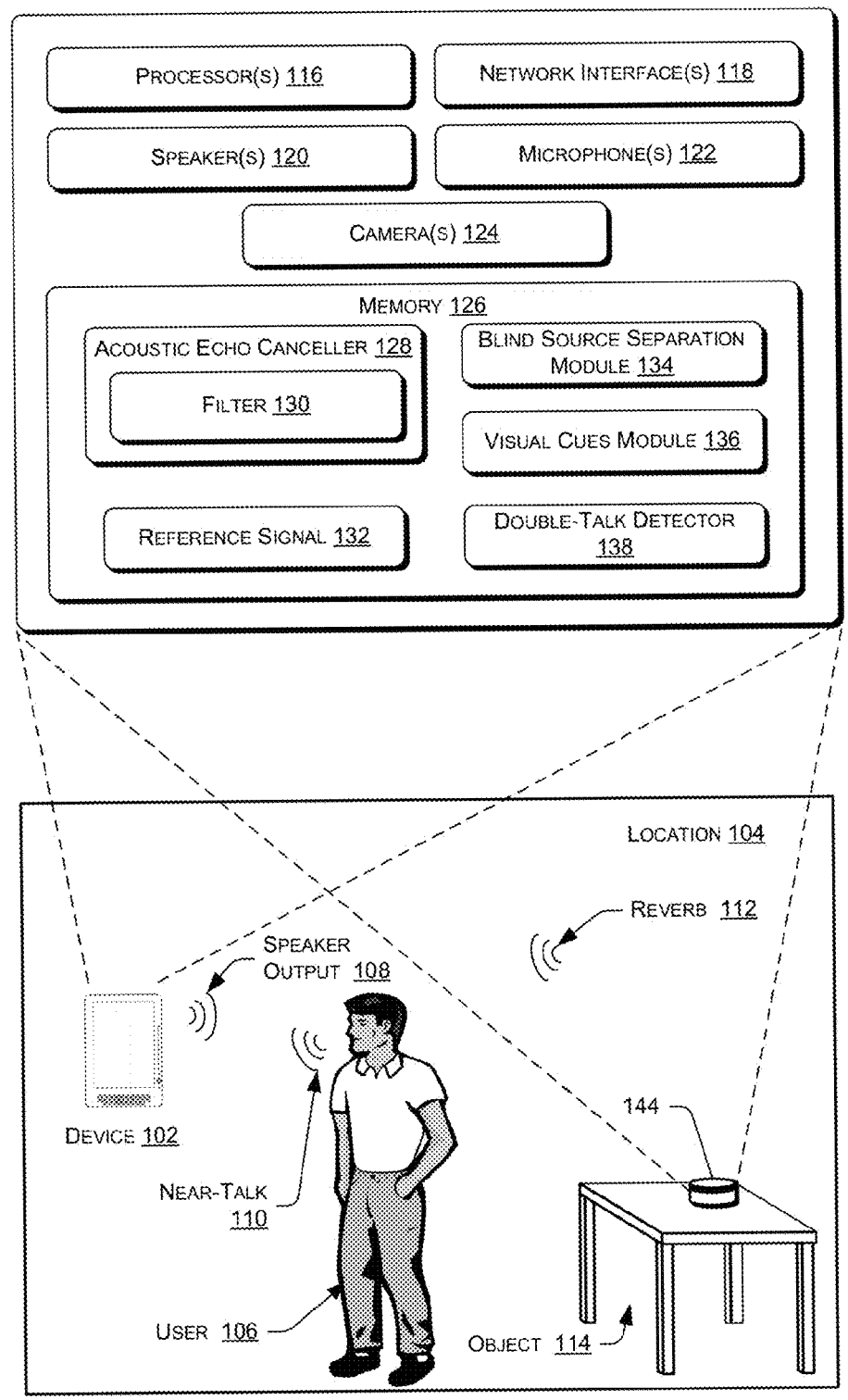
FIG. 1 illustrates example devices used by an entity, such as a person, to engage in a conversation with a remote conversation partner (i.e., a far end talker). The devices are configured to utilize blind source separation and an acoustic echo canceller to remove, at least partly, an acoustic echo of the remote conversation partner's speech, which is output by the loudspeaker of a device and captured by a microphone of the device.

This disclosure describes techniques for enhancing acoustic echo cancellation by using blind source separation as a front-end to an acoustic echo canceller. The acoustic echo canceller may be incorporated in a device, such as a telecommunications device, an electronic reading device, a tablet computing device, a voice controlled assistant, and so forth. Such a device may enable a user to communicate with another, remote user through an audio or audiovisual conversation. One well-known drawback to conversations involving audio, however, is the acoustic echo. An acoustic echo is an audio signal captured by a microphone of the device that corresponds to speech of the remote conversation partner (e.g., also known as a "far end talker") which has been played by the loudspeaker (also referred to as a "speaker") of the device. When this acoustic echo is then relayed to and output by a loudspeaker of the remote conversation partner's device, the remote conversation partner will have his or her speech played back, causing the remote conversation partner to experience a slightly delayed echo of his or her voice. To prevent this transmission of audio that corresponds to an acoustic echo, devices that enable audio conversations often include acoustic echo cancellers. An acoustic echo canceller captures the audio received from another device and which is to be provided to the loudspeaker of the device and utilizes that audio as a reference signal. The acoustic echo canceller also includes a filter that adaptively learns the distortion effects of the location of the device, also known as the "impulse response" of that location, on the sound output by the loudspeaker. Based on the reference signal and the filter, the acoustic echo canceller substantially removes the acoustic echo from the audio signal. Some portion of the acoustic echo may remain, however, especially at the beginning of a conversation when the filter may not have fully adapted.

In various embodiments described herein, the device that includes the acoustic echo canceller is configured with a blind source separation module to perform blind source separation and acoustic echo removal on the captured audio signal before providing the audio signal to the acoustic echo canceller for further acoustic echo cancellation. Upon capturing the audio signal from a surrounding location using one or more microphones, the blind source separation module determines a number of source signals to associate with the audio signal. The blind source separation module may determine this number of source signals based on the number of microphones used to capture the audio signal or based on a number of entities (e.g., persons) speaking at the location. In some implementations, a visual cues module of the device may determine the number of entities speaking at the location from one or more images of the location captured by camera(s) associated with the device and inform the blind source separation module of the number of entities speaking. After determining the number of source signals, the blind source separation module generates the corresponding source signals based at least in part on the audio signal that was captured by the microphone(s). The blind source separation module may use any of a number of blind source separation techniques to produce source signals that are statistically decorrelated and independent.

In various embodiments, the blind source separation module may then compare each of the maximally separated source signals to the reference signal identified by the acoustic echo canceller to determine which of the source signals is most highly correlated to the reference signal. Upon determining the source signal that is most highly correlated to the reference signal, the blind source separation module removes, at least in part, that source signal. The blind source separation module then provides the other source signal and remaining portions of the source signal to another module, such as the acoustic echo canceller. The blind source separation module may also notify a double-talk detector associated with the acoustic echo canceller that the removed source signal substantially corresponded to the reference signal.

In further embodiments, the acoustic echo canceller then utilizes its filter and the reference signal to determine other portions of one or more of the remaining source signals that correspond to the acoustic echo and to remove those portions. Portions of the other source signals that correspond to the acoustic echo as determined by the adaptive filter are removed. The resulting audio signal output by the acoustic echo canceller has the acoustic echo substantially removed.

In some embodiments, as mentioned, the blind source separation module notifies a double-talk detector associated with the acoustic echo canceller that the removed source signal substantially corresponded to the reference signal. The double-talk detector then analyzes the remaining source signals output by the blind source separation module to determine if any of the remaining source signals include speech characteristics. If one of the remaining source signals includes speech characteristics, the double-talk detector may declare a double-talk condition, causing the acoustic echo canceller to change adaptation of the filter by, for example, halting or slowing down adaptation. The double-talk condition reflects a determination that the input audio signal includes both an acoustic echo (corresponding to the reference signal) and speech from the user of the device (also called "near-talk"). The acoustic echo canceller changes (e.g., halts or slows down) adaptation of the filter during double-talk to prevent the filter coefficients from adapting to the near-talker and hence diverging from the optimal solution. Upon determining that the double-talk condition has ended, the acoustic echo canceller may again change (e.g., resume or accelerate) adaptation of the filter.

Example Device and Environment

FIG. 1 illustrates an example environment 100 in which an entity (e.g., a person) uses a device 102 at a location 104 to engage in a conversation. As illustrated, a device 102 is implemented as a tablet, communication device, eBook device, or other type of device having a display. This device 102 may be utilized at the location 104 by a user 106 to engage in an audio or audiovisual conversation with a remote conversation partner. The device 102 outputs conversation from the remote conversation partner (i.e., the far end talker—who is not shown) via a loudspeaker output 108 and concurrently captures near-talk 110 of the user 106 (i.e., the near end talker) and reverb 112 from the location 104. The location 104 may include one or more objects 114 that determine the acoustic characteristics of the reverb 112.

As is further shown in FIG. 1, the device 102 includes one or more processors 116, network interface(s) 118, speaker(s) 120, microphone(s) 122, and camera(s) 124. While the speaker(s) 120, microphone(s) 122, and camera(s) 124 are shown as being integrated in the device 102, they may also or instead be positioned at different places in the location and communicate with the device 102 in a wired or wireless fashion. The device 102 further includes memory 126 to store various modules, such as an acoustic echo canceller 128 having a filter 130, a reference signal 132, a blind source separation module 134, a visual cues module 136, and a double-talk detector 138.

In various embodiments, the device 102 may be any kind of mobile electronic device (e.g., a laptop computer, a tablet computing device, a telecommunications device, electronic reading device, multifunction communication device, a portable digital assistant (PDA), etc.) or non-mobile electronic device (e.g., a desktop computer, a television, a voice controlled assistant, etc.). For example purposes, a second device 144 is shown positioned on the table 114. The second device 144 is implemented as a voice controlled assistant that is primarily, if not exclusively, controlled by verbal interaction with the user 106. The voice controlled assistant 114 may implement essentially the same components in FIG. 1 as the device 102. In addition, while FIG. 1 illustrates several example components of the devices 102 and 144, it is to be appreciated that the devices may also include other conventional components, such as an operating system, system busses, input/output components, and the like.

The location 104 may be an enclosed space, such as a room or office, or alternatively an open space, such as the outdoors. In an enclosed or open space, different surfaces and objects 114 with different acoustic characteristics may be in some level of proximity to the user 106 and the devices 102 and 144. For example, FIG. 1 illustrates a table 114 being in proximity to the user 106 and the device 102. These objects 114, and any surfaces, such as a floor, ground, walls, a ceiling, and even the air at the location 104, all comprise the acoustic space at the location 104, whereby the acoustic space has acoustic characteristics that affect an impulse response or reverb 112 to audio or other sounds occurring at the location 104.

FIG. 1 further illustrates a variety of sounds at the location 104. Speakers 120 of the device 102 (or device 144) play the audio speaker output 108, and microphones 122 of the device 102 capture near-talk 110 of the user 102, background noise from the location 104, and a version of the speaker output 108 distorted by the acoustic space of the location 104, also referred to as the "reverb 112." As mentioned further herein, the speakers 120 and microphones 122 may be integrated in the device 102, placed at different positions in the location 104, or both.

In some embodiments, cameras 124 may also be placed at different positions in the location 104, capturing different views of the location 104 and the user 106. Alternatively, cameras 124 may be located exclusively in the device 102.

As further illustrated in FIG. 1, the device 102 includes processor(s) 116 and network interface(s) 118. The processor(s) 116 may be or include any sort of processing unit, such as a central processing unit (CPU) or a graphic processing unit (GPU). The network interface(s) 118 allow the device 102 to communicate with the remote conversation partner, with an intermediate network, or with one or more other devices or networks. The network interface(s) 118 may send and receive communications through the intermediate network or other networks. The network interface(s) 118 may also support both wired and wireless connection to various networks.

In various embodiments, the speaker(s) 120, microphone(s) 122, and camera(s) 124 include any of speaker(s) 120, microphone(s) 122, and camera(s) 124 that are physically integrated into the device 102 or speaker(s) 120, microphone(s) 122, and camera(s) 124 that are distributed at different places within the location 104 and communicatively coupled to the device 102 through wired or wireless means. The speaker(s) 120, microphone(s) 122, and camera(s) 124 may be any sort of speaker(s) 120, microphone(s) 122, and camera(s) 124 and may store any of the components 128-138 stored in the memory 126 of the device 102. For example, the camera(s) 124 may store the visual cues module 136 or sub-modules of the visual cues module 136.

Depending on the configuration of the device 102, the memory 126 (and other memories described throughout) is an example of computer-readable storage media and may include volatile and nonvolatile memory. Thus, the memory 126 may include, but is not limited to, RAM, ROM, EEPROM, flash memory, or other memory technology, or any other medium which can be used to store media items or applications and data which can be accessed by the device 102.

In various embodiments, as mentioned, the memory 126 stores the acoustic echo canceller 128, which is executable on the processor(s) 116. While the acoustic echo canceller 128 is shown stored in the memory 126 in FIG. 1, the acoustic echo canceller 128 may instead comprise an application-specific memory and processor or may be stored and implemented entirely or partially on a remote device. Regardless of where the acoustic echo canceller 128 is stored, the acoustic echo canceller 128 is configured to determine a reference signal 132 upon receiving audio input from a device of a remote conversation partner. This audio input corresponds to the audio signal provided to the speaker(s) 120 for output as speaker output 108. The reference signal 132 is then retained by the device 102 for use in acoustic echo cancellation.

The acoustic echo canceller 128 also removes at least a portion the acoustic echo from the audio signals output by the blind source separation module 134. The acoustic echo includes both a direct path sound of the speaker output 108 captured by the microphone(s) 122 with minimal distortion, and the reverb 112, which is the speaker output 108 distorted by the acoustic space of the location 104. To substantially remove the remaining acoustic echo after the blind source separation module has removed a portion of the acoustic echo, the acoustic echo canceller 128 utilizes an adaptive filter 130 to determine portions of the audio signal outputs that include acoustic echo. The acoustic echo canceller 128 subtracts the reference signal 132 from the filtered audio signal outputs. The audio signals resulting from the subtraction contains the near-talk 110 and background noise, and substantially none of the acoustic echo. These audio signals may then be transmitted back to a communication network, such as a cellular or data network as an audio signal output, or may first have the background noise reduced from the signal by a noise reduction module of the device 102.

In various embodiments, the filter 130 is an adaptive filter of the acoustic echo canceller 128. The filter 130 is a model of the acoustic attributes of the speaker(s) 120, the microphone(s) 122, and the location 104 and includes coefficients that are calibrated or otherwise adjusted to progressively improve its specification of those acoustic attributes.

The acoustic echo canceller 128 may adapt the filter 130 on an ongoing basis. In order to accurately filter the captured audio signal, however, the acoustic echo canceller 128 is configured to change adaptation in response to the double-talk detector 138 declaring a double-talk condition. The acoustic echo canceller 128 changes adaptation of the filter 130 to prevent or inhibit the filter from adapting based on speech. Upon determining that the double-talk condition has ended, the acoustic echo canceller 128 may again change (e.g., in reverse of the previous change) adaptation of the filter 130.

In some implementations, the blind source separation module 134 performs blind source separation and acoustic echo removal on the audio signal captured by the microphone(s) 122 before providing the audio signal to the acoustic echo canceller 128 for further acoustic echo cancellation. Upon receiving the audio signal from the microphone(s) 122, the blind source separation module 134 determines a number of source signals to associate with the audio signal. The blind source separation module 134 may determine this number of source signals based on the number of microphone(s) 122 used to capture the audio signal or based on the number of speakers depicted at the location 104. The visual cues module 136 of the device 102 may determine the number of speakers at the location 104 from one or more images of the location 104 captured by camera(s) 124 and inform the blind source separation module 134 of the number of speakers. After determining the number of source signals, the blind source separation module 134 generates the source signals based on the audio signal. The blind source separation module 134 may use any of a number of blind source separation techniques to produce source signals that are statistically decorrelated and independent.

In various embodiments, the blind source separation module 134 may then compare each of the source signals to the reference signal 132 to determine which of the source signals is most highly correlated to the reference signal 132. Upon determining the source signal that is most highly correlated to the reference signal 132, the blind source separation module 134 removes, at least in part, that source signal from the other source signals constituting the audio signal product of the blind source separation module 134. The blind source separation module 134 then provides the other source signals to the acoustic echo canceller 128 and may notify a double-talk detector 138 associated with the acoustic echo canceller 128 that the removed source signal substantially corresponded to the reference signal 132.

In various implementations, the visual cues module 136 may be stored in memory 126 and implemented on the device 102, implemented on a camera 124 that is separate from but communicatively coupled to the device 102, or implemented in part on both the device 102 and a separate camera 124. The visual cues module 136 receives images and tests to see if the images depict person(s) speaking at the location 104. For example, the visual cues module 136 may determine that the images depict a person and that a sequence of those images captured in a specified time period depicts the person's lips moving. The depicted person may be the user 106 or a different individual. The visual cues module 136 may determine that the lips are moving based on comparisons of images to each other, based on a model of a person speaking, or based on both a comparison and a model. Based on the analysis of the images, the visual cues module 136 determines a count of the number of persons speaking and provides that count to the blind source separation module 134.

The double-talk detector 138 may be part of the acoustic echo canceller 128 or may be a separate module that is configured to communicate with the acoustic echo canceller 128. The double-talk detector 138 detects when the audio signal captured by the microphone(s) 122 includes near-talk 110 and an acoustic echo and, in response, declares a double-talk condition. When the audio signal includes only near-talk 110 and no speaker output 108 or reverb of the speaker output 108, detection is easy and can simply involve determining if the audio signal includes speech characteristics. However, when the audio signal includes both near-talk 110 and one or both of speaker output 108 or reverb 112 of the speaker output 108, "double-talk" is deemed to be occurring. To detect when double-talk is occurring, the double-talk detector 138 may first determine that an audio signal includes a voice signal that substantially corresponds to the reference signal 132 or receive an indication from the blind source separation module 134 that one of the source signals substantially corresponded to the reference signal 132. The double-talk detector 138 then determines that one of the remaining source signals exhibits/includes speech characteristics and, based on this, concludes that the captured audio signal includes near-talk 110. The double-talk detector 138 then declares a double-talk condition and informs the acoustic echo canceller 128 of the double-talk condition.

In some embodiments, upon determining that the double-talk condition has ended, the double-talk detector 138 informs the acoustic echo canceller of the end of the double-talk condition and the acoustic echo canceller 128 resumes/accelerates adaptation of the filter 130. The acoustic echo canceller 128 continues to apply the filter 130 to the remaining source signals, which, as mentioned, exclude the source signal that substantially corresponded to the reference signal.

In some instances, the electronic device 102 may have features or functionality in addition to those illustrated in FIG. 1. For example, the device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 102 may reside remotely from the device 102 in some implementations. In these implementations, the device 102 may utilize the network interface(s) 118 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Processes

Figure 2:
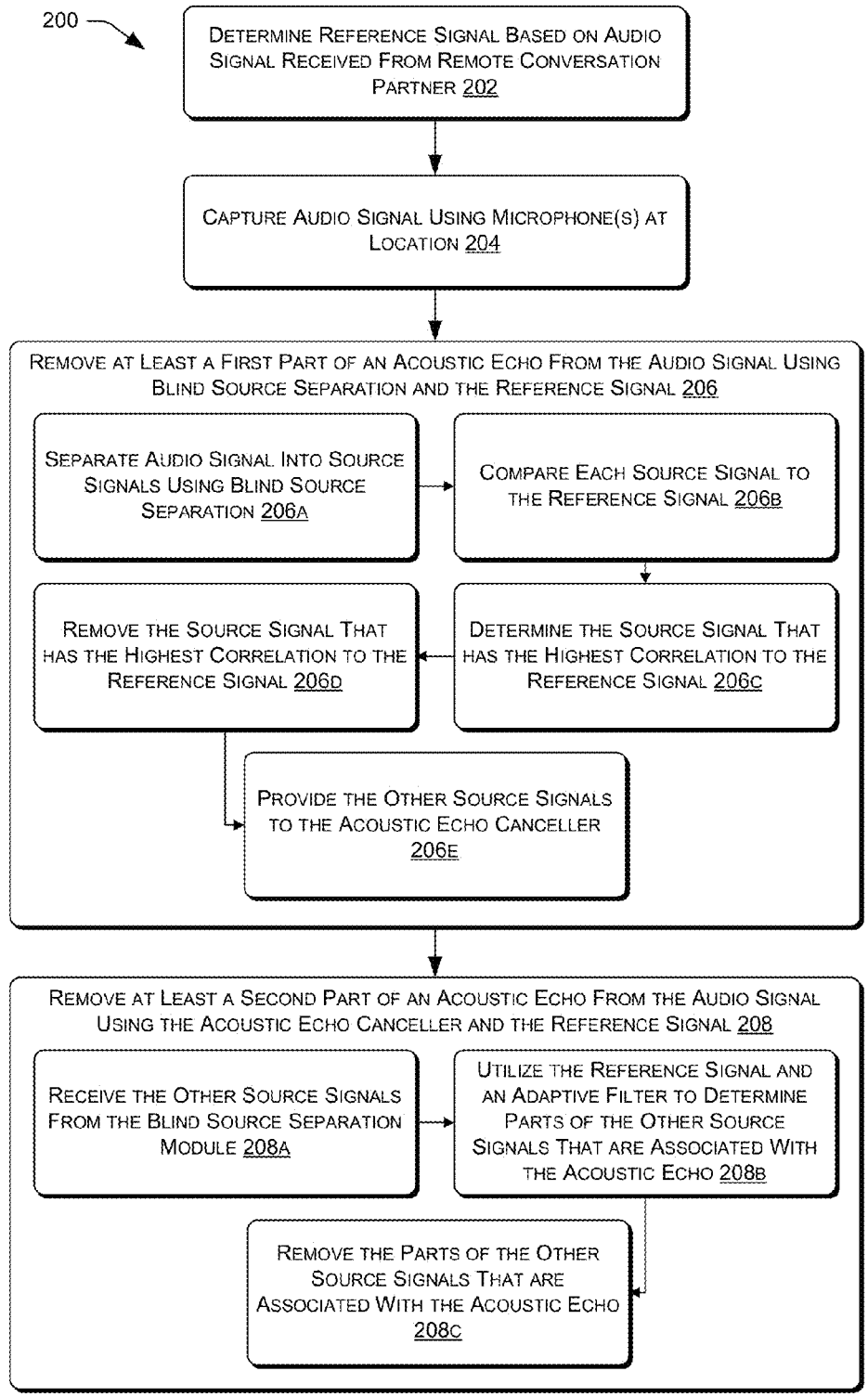
FIG. 2 illustrates an example process for processing an audio signal that includes an acoustic echo by removing a first portion of the acoustic echo using blind source separation and removing a second portion of the acoustic echo using an acoustic echo canceller.

FIG. 2 illustrates an example process 200 for processing an audio signal that includes an acoustic echo by removing a first portion of the acoustic echo using blind source separation and removing a second portion of the acoustic echo using an acoustic echo canceller. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The processes 200 (and processes 300 and 400) may be performed by any number of devices. For discussion purposes, these processes are described with reference to the architecture of FIG. 1, and hence several of the operations are described as being performed by the modules in the device 102 (or 144). This is merely for example purposes, however, and not intended to be limiting.

The process 200 includes, at 202, determining a reference signal upon receiving an audio signal from a device of a remote conversation partner. This determination may be made, for example, by the acoustic echo canceller 128. The reference signal may substantially correspond to that received audio signal. Loudspeaker(s) of the device that includes the acoustic echo canceller may then play the received audio signal.

At 204, an audio signal is captured at the location. In the described implementations, the device captures an audio signal that includes an acoustic echo using one or more microphones of the device. The acoustic echo may be an acoustic echo of the sound output by the loudspeaker(s). In addition to this acoustic echo, the captured audio signal may include speech of the user of the device, also referred to as "near-talk." The acoustic echo includes a direct path sound of the remote conversation partner's voice played by the speaker(s) and a reverb of the direct path sound.

At 206, a first portion of the acoustic echo is removed from the audio signal. In one implementation, the blind source separation module 134 uses blind source separation and the reference signal to remove the first portion of the acoustic echo from the audio signal. This operation may involve several sub-operations, shown as individual blocks 206A-E. At 206A, a plurality of source signals are generated from the audio signal. The number of source signals may be determined in a number of ways. For instance, the blind source separation module 134 may choose a number based on how many microphones were used to capture the audio signal. Alternatively, visual images may be used to identify a number of speakers, as will be described below with reference to FIG. 3. At 206B, the blind source separation module compares each of the source signals to the reference signal and, at 206C, determines which source signal is most highly correlated to the reference signal. At 206D, the blind source separation module then removes, at least in part, the source signal that is most highly correlated to the reference signal. By removing this source signal, the blind source separation module essentially removes a substantial portion of the acoustic echo. At 206E, the blind source separation module provides the other, remaining source signals to the acoustic echo canceller.

At 208, a second portion of the acoustic echo is removed from the audio signal. In one implementation, the acoustic echo canceller 128 removes the second portion of the acoustic echo using, in part, the reference signal. As above, this operation may involve several sub-operations, shown as individual blocks 208A-C. At 208A, the acoustic echo canceller 128 receives the other source signals from the blind source separation module. At 208B, the acoustic echo canceller 128 utilizes the reference signal and an adaptive filter of the acoustic echo canceller to determine a portion of the other source signals that is associated with the acoustic echo. At 208C, the acoustic echo canceller 128 removes the determined portion from the other source signals to produce an output audio signal that has the acoustic echo substantially removed.

Figure 3:
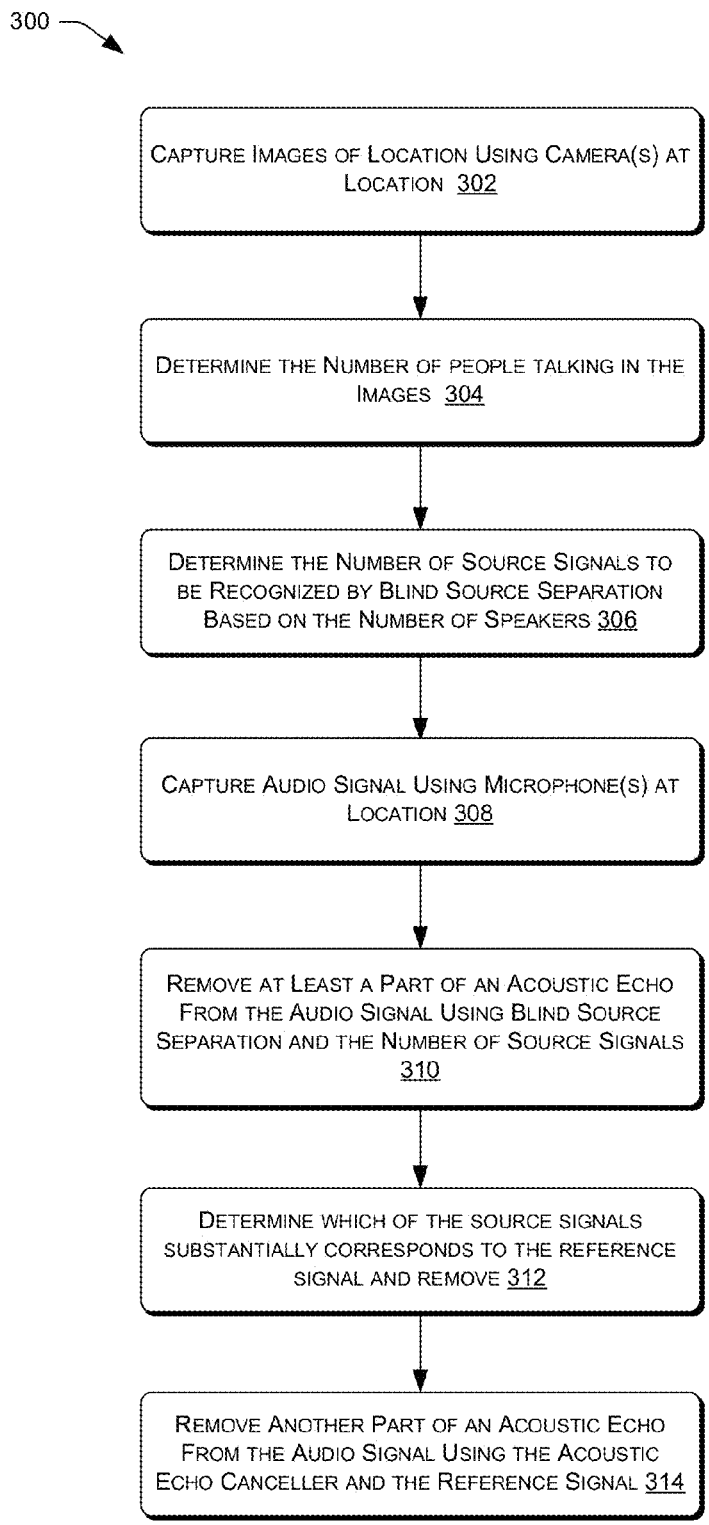
FIG. 3 illustrates an example process for using images of a location to aid in determining a number of source signals to be separated and removing at least a portion of an acoustic echo from an audio signal using blind source separation and the determined number of source signals.

FIG. 3 illustrates an example process 300 for using images of a location to aid in determining a number of source signals to be generated and removing at least a portion of an acoustic echo from an audio signal using blind source separation and the determined number of source signals. At 302, camera(s) associated with a device capture images of a location. The cameras may be implemented as part of the device, or separate from the device. In the latter implementation, the images are transferred to the device for further processing.

At 304, the number of people talking in the images is determined. In one implementation, the device examines the images to ascertain how many people depicted in the images as present at the location are talking.

At 306, the number of source signals to be separated is determined based on the number of people found to be talking. In one implementation, the blind source separation module 134 determines the number of source signals to recognize in an audio signal based on the number of persons depicted in the images as talking.

At 308, an audio signal is captured by microphone(s) at the location. The audio signal includes an acoustic echo.

At 310, the blind source separation module 134 removes at least a portion of the acoustic echo using blind source separation and the number of source signals. The blind source separation module of the source signals based at least in part on the audio signal, that number corresponding to the determined number of source signals.

At 312, the blind source separation module 134 determines which of the source signals substantially corresponds to a reference signal and removes, at least in part, that source signal.

At 314, the acoustic echo canceller 128 removes another portion of the acoustic echo from the remaining source signals by utilizing the reference signal and an adaptive filter.

Figure 4:
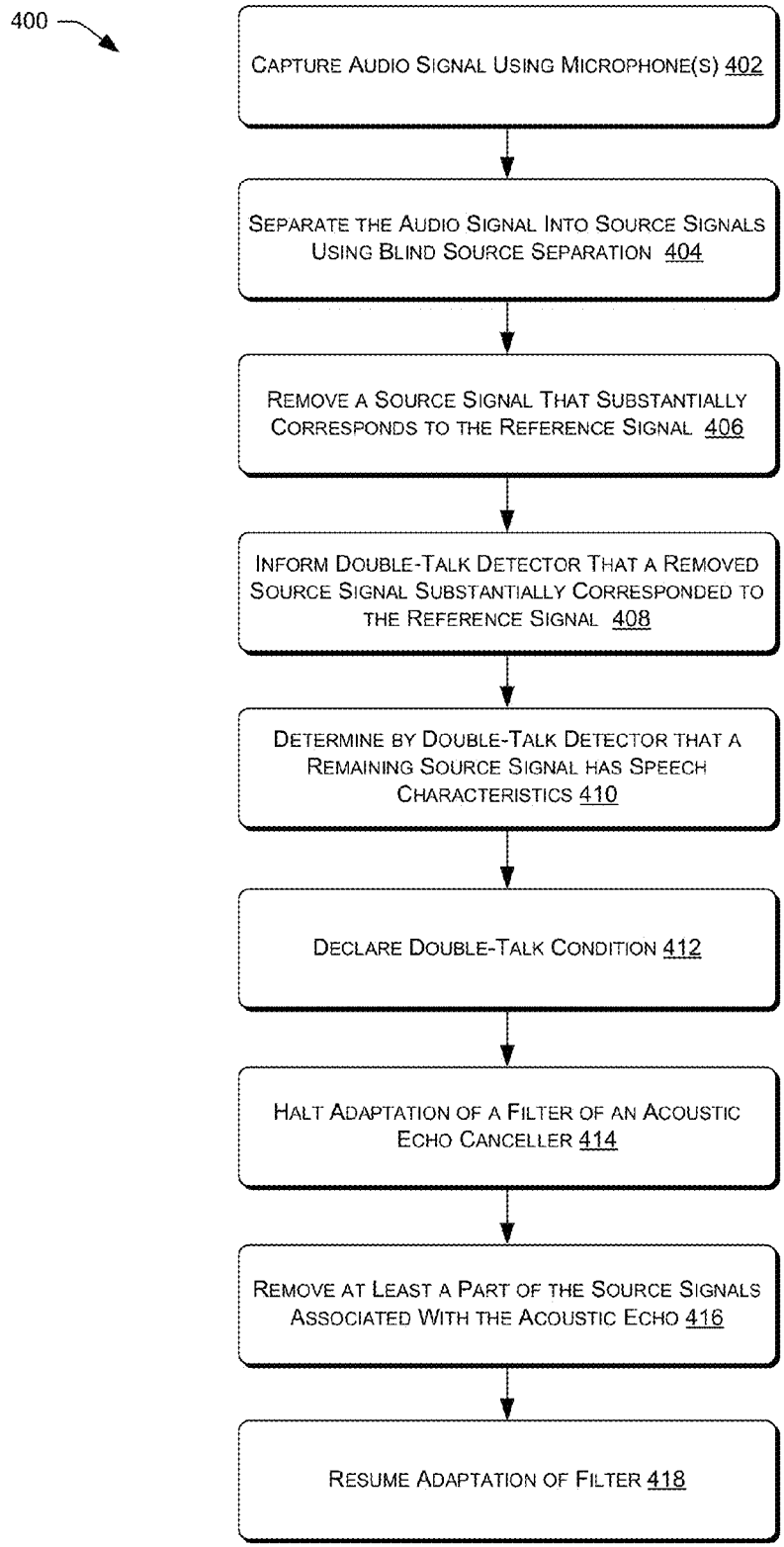
FIG. 4 illustrates an example process for utilizing blind source separation in reducing double-talk.

FIG. 4 illustrates an example process 400 for utilizing blind source separation in reducing double-talk. More particularly, the process 400 uses blind source separation to recognize that one of a plurality of source signals corresponds to a reference signal and utilizes a doubt-talk detector to determine that another of the source signals exhibits speech characteristics. In response, a double-talk condition is declared, causing the acoustic echo canceller to change adaptation of its filter.

At 402, an audio signal is captured using microphone(s) of a device. The captured audio signal includes an acoustic echo.

At 404, multiple source signals are generated from the audio signal. In one implementation, the blind source separation module 134 generates the various source signals.

At 406, the source signal that closely resembles the reference signal is substantially removed. That is, the blind source separation module 134 recognizes that this source signal is essentially the same as the reference signal, and hence removes it.

At 408, the blind source separation module 134 informs the double-talk detector 138 of the device that one of the source signals substantially corresponded to the reference signal and has been removed.

At 410, the double-talk detector 138 determines if any of the remaining source signals exhibits/includes speech characteristics. If so, at 412, the double-talk detector 138 declares a double-talk condition.

At 414, responsive to declaring the double-talk condition, the acoustic echo canceller 128 of the device changes adaptation of the filter 130.

At 416, the acoustic echo canceller 128 also removes another portion of the acoustic echo from the remaining source signals by utilizing the filter and the reference signal.

At 418, the acoustic echo canceller 128 again changes (e.g., resumes or accelerates) adaptation of the filter 130 responsive to receiving an indication from the double-talk detector that the double-talk condition is no longer occurring. The filter 130 thus adapts based on source signals received from the blind source separation module. The received source signals exclude the removed source signal.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
at least one microphone to receive an audio signal, the audio signal to include an acoustic echo corresponding to sound output by a speaker of the system and the sound being based on a reference signal provided to the speaker;
a blind source separation module to generate a plurality of source signals based at least in part on the received audio signal, compare each of the sources signals to the reference signal, determine which of the source signals has a highest correlation to the reference signal, and remove, at least in part, the source signal with the highest correlation to the reference signal from the audio signal; and
at least one acoustic echo canceller to receive remaining source signals that were not removed by the blind source separation module, determine, based at least in part on the reference signal, a portion of the remaining source signals that are associated with the acoustic echo, and remove, at least in part, the determined portion from the remaining source signals to produce a processed audio signal.

2. The system of claim 1, further comprising a visual cues module to determine, from images of a location, a number of people at the location, and to inform the blind source separation module of the number of people; and
the blind source separation module being configured to utilize the number of people to determine the number of source signals to recognize in the received audio signal.

3. The system of claim 1, further comprising a double-talk detector to receive an indication from the blind source separation module that one of the source signals substantially corresponds to the reference signal and, in response, to determine whether another of the source signals includes speech characteristics, whereupon determining that another of the signals includes the speech characteristics, the double-talk detector declares a double-talk condition.

4. The system of claim 3, wherein the double-talk detector informs the acoustic echo canceller of the double-talk condition and, in response, the acoustic echo canceller is configured to change adaptation of the adaptive filter.

5. A method comprising:
receiving, by a computing device, an audio signal that includes an acoustic echo corresponding to sound output by a speaker of the computing device, the sound being based on a reference signal provided to the speaker;
removing, by the computing device, a first portion of the acoustic echo from the audio signal using blind source separation and the reference signal, wherein the removing comprises generating a plurality of source signals based at least in part on the audio signal and comparing each of the sources signals to the reference signal;
receiving, by the computing device, an indication that one of the source signals substantially corresponds to the reference signal and, in response, to determining whether another of the source signals includes speech characteristics;

determining, by the computing device, a double-talk condition whereupon determining that another of the signals includes the speech characteristics; and removing, by the computing device, a second portion of the acoustic echo from the audio signal using adaptive filtering and the reference signal, wherein the adaptation of the adaptive filtering is modified in response to declaration of the double-talk condition.

6. The method of claim 5, further comprising capturing the audio signal by one or more microphones associated with the computing device.

7. The method of claim 5, wherein the acoustic echo includes the sound output by the speaker and a reflection of the sound output by the speaker.

8. The method of claim 5, further comprising receiving an audio signal from a remote device and determining the reference signal based at least in part on the audio signal received from the remote device.

9. The method of claim 5, wherein removing the first portion of the acoustic echo comprises:

determining which of the source signals has a highest correlation to the reference signal;

removing, at least in part, the source signal that has the highest correlation to the reference signal from the audio signal; and providing other source signals comprising the audio signal for adaptive filtering.

10. The method of claim 9, further comprising determining how many microphones were used to capture the audio signal and performing the generating based at least in part on the determined number of microphones.

11. The method of claim 9, wherein the removed source signal comprises a substantial portion of the acoustic echo.

12. The method of claim 9, wherein removing the second portion of the acoustic echo comprises:

receiving the other source signals;

utilizing the reference signal and an adaptive filter to determine a portion of the other source signals that is associated with the acoustic echo; and removing, at least in part, the determined portion from the other source signals to produce output processed audio signal.

13. One or more non-transitory computer-readable media storing computer-executable instructions that, when executed by a computing device, perform operations comprising:

determining a number of source signals to be recognized by blind source separation based at least in part on images of a location;

receiving an audio signal captured at the location, the audio signal including an acoustic echo corresponding to sound output by a speaker of the computing device, the sound being based on a reference signal provided to the speaker; and removing at least a portion of the acoustic echo from the audio signal using the blind source separation, the determined number of source signals, and the reference signal.

14. The one or more non-transitory computer-readable media of claim 13, wherein the operations further comprise removing, at least in part, another portion of the acoustic echo from the audio signal using an acoustic echo canceller and the reference signal.

15. The one or more non-transitory computer-readable media of claim 13, wherein the determined number of source signals corresponds to a number of people at the location who are depicted by the images.

16. The one or more non-transitory computer-readable media of claim 13, wherein the images are captured by one or more cameras.

17. A system comprising:

a speaker;

one or more processors;

a blind source separation module that, when executed by the one or more processors, generates a plurality of source signals based at least in part on an audio signal and determines that one of the source signals substantially corresponds to a reference signal, the reference signal being provided for output by the speaker;

a double-talk detector that, when executed by the one or more processors, determines that another of the source signals includes speech characteristics and, in response, declares a double-talk condition;

an acoustic echo canceller that, when executed by the one or more processors, changes adaptation of a filter of the acoustic echo canceller in response to a double-talk condition being declared; and wherein the blind source separation module removes, at least partly, said one of the source signals that substantially corresponds to the reference signal from the audio signal and provides an indication to the double-talk detector that one of the source signals substantially corresponds to the reference signal.

18. The system of claim 17, wherein the acoustic echo canceller utilizes the reference signal and the filter to remove, at least partly, at least a portion of the audio signal that corresponds to an acoustic echo corresponding to the sound output by the speaker of the system.

19. The system of claim 17, wherein the acoustic echo canceller changes adaptation of the filter responsive to receiving an indication from the double-talk detector that the double-talk condition is no longer occurring and adapts the filter based on source signals received from the blind source separation module.

20. The system of claim 19, wherein the source signals received from the blind source separation module exclude a source signal that substantially corresponds to the reference signal.

21. A system comprising:

a speaker;

one or more processors;

a blind source separation module that, when executed by the one or more processors, generates a plurality of source signals based at least in part on an audio signal and determines that one of the source signals substantially corresponds to a reference signal, the reference signal being provided for output by the speaker; and a double-talk detector that, when executed by the one or more processors, receives an indication from the blind source separation module that said one of the source signals substantially corresponds to the reference signal and, in response, determines whether another of the source signals includes speech characteristics, whereupon determining that another of the signals includes the speech characteristics, the double-talk detector declares a double-talk condition.

22. The system of claim 21, further comprising an acoustic echo canceller that, when executed by the one or more processors, changes adaptation of a filter of the acoustic echo canceller in response to the double-talk condition being declared.

23. The system of claim 22, wherein the acoustic echo canceller changes adaptation of the filter responsive to receiving an indication from the double-talk detector that the double-talk condition is no longer occurring and adapts the filter based on source signals received from the blind source separation module.

24. The system of claim 23, wherein the source signals received from the blind source separation module exclude a source signal that substantially corresponds to the reference signal.

* * * * *